US011460141B2

(12) United States Patent
Lannan

(10) Patent No.: US 11,460,141 B2
(45) Date of Patent: Oct. 4, 2022

(54) ASSEMBLY FOR ENGAGING THE INTERIOR OF A PIPE

(71) Applicant: Vital Industrial Solutions Inc., Sarnia (CA)

(72) Inventor: Thomas John Lannan, Sarnia (CA)

(73) Assignee: Vital Industrial Solutions Inc., Sarnia (CA)

( * ) Notice: Subject to any disclaimer, the term of this patent is extended or adjusted under 35 U.S.C. 154(b) by 0 days.

(21) Appl. No.: 15/733,251

(22) PCT Filed: Oct. 3, 2018

(86) PCT No.: PCT/CA2018/051250
§ 371 (c)(1),
(2) Date: Jun. 17, 2020

(87) PCT Pub. No.: WO2019/119111
PCT Pub. Date: Jun. 27, 2019

(65) Prior Publication Data
US 2020/0386361 A1    Dec. 10, 2020

Related U.S. Application Data

(60) Provisional application No. 62/608,152, filed on Dec. 20, 2017.

(51) Int. Cl.
*F16L 55/40* (2006.01)
*B23K 101/06* (2006.01)
(Continued)

(52) U.S. Cl.
CPC .......... *F16L 55/40* (2013.01); *F16L 2101/30* (2013.01)

(58) Field of Classification Search
CPC ..... F16L 55/40; F16L 2101/30; F16L 55/132; B23K 2101/06; B23K 37/0531;
(Continued)

(56) References Cited

U.S. PATENT DOCUMENTS 4,624,824 A    11/1986 Dooley
5,844,127 A    12/1998 Berube et al.
(Continued)

FOREIGN PATENT DOCUMENTS

CN    202674701 U  *  1/2013
CN    202674701 U     1/2013
(Continued)

OTHER PUBLICATIONS

International Search Reporting issued in corresponding PCT Application No. PCT/CA2018/051250; search completed Jan. 8, 2019.

*Primary Examiner* — Herbert K Roberts
*Assistant Examiner* — Anthony W Megna Fuentes
(74) *Attorney, Agent, or Firm* — CPST Intellectual Property Inc.; Santosh K. Chari

(57) ABSTRACT

An assembly is provided that includes first and second end plates adapted to be coaxially aligned when in use. One or more members extend from the end plates or an annular ring, the annular ring provided between the end plates, the other of the end plates or annular ring comprising one or more first slots at one end thereof to be aligned with and for receiving the one or more members of the first end plate, and one or more second slots at the other end thereof to be aligned with and for receiving the one or more members. Resilient sealing members are provided around the one or more members between the end plates and annular ring, and an urging mechanism urges the first and second end plates towards the annular ring to deform the first and second resilient sealing members to engage the inner wall of the pipe.

12 Claims, 8 Drawing Sheets

(51) Int. Cl.
  *B23K 37/053* (2006.01)
  *B23K 9/00* (2006.01)
  *B23K 9/028* (2006.01)
  *B23K 9/23* (2006.01)
  *B23K 9/32* (2006.01)
  *B23K 31/02* (2006.01)
  *F16L 55/132* (2006.01)
  *F16L 101/30* (2006.01)

(58) Field of Classification Search
  CPC ...... B23K 9/0026; B23K 9/0286; B23K 9/23; B23K 9/326; B23K 31/02
  See application file for complete search history.

(56) References Cited

U.S. PATENT DOCUMENTS 6,131,441 A * 10/2000 Berube .................. G01M 3/04
                                                    73/49.8
6,513,549 B2    2/2003 Chen

FOREIGN PATENT DOCUMENTS

| DE | 10319166 B4 | 8/2006 |
| DE | 102007043810 B3 | 6/2009 |
| WO | 2007041856 A1 | 4/2007 |
| WO | 2010022502 A1 | 3/2010 |

\* cited by examiner

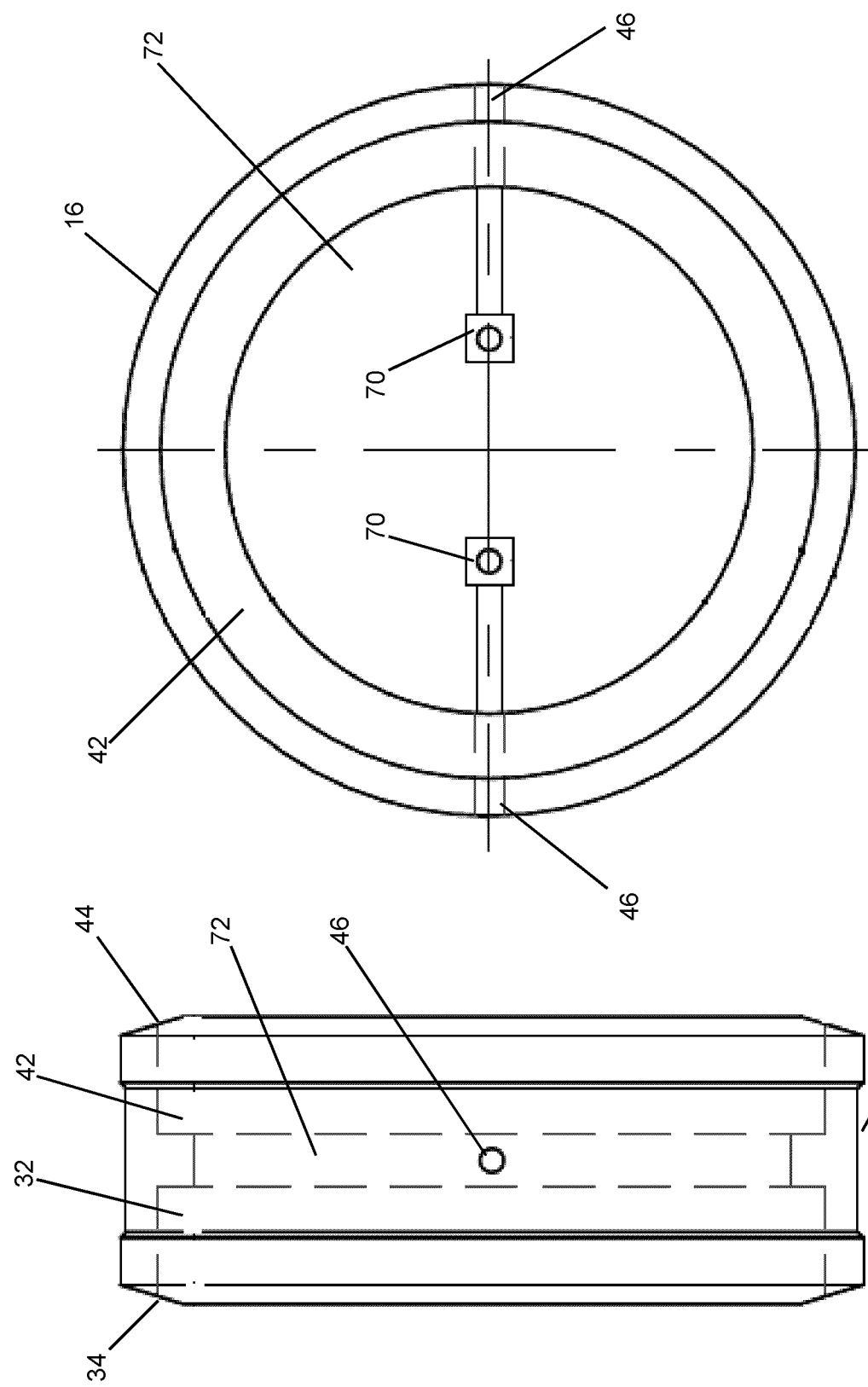

ASSEMBLY FOR ENGAGING THE INTERIOR OF A PIPE

CROSS-REFERENCE TO RELATED APPLICATION(S)

This application is a National Entry of PCT Application No. PCT/CA2018/051250, filed on Oct. 3, 2018, which claims the benefit of priority to U.S. Provisional Patent Application No. 62/608,152 entitled "Assembly for Engaging the Interior of a Pipe" and filed on Dec. 20, 2017. The contents of the aforementioned applications are incorporated herein by reference as if set forth in their entirety.

TECHNICAL FIELD

The following relates to an assembly for engaging the interior of a pipe, in particular a self-centering assembly used to secure testing or isolation tools within the pipe.

BACKGROUND

It is common for testing tools to be utilized for testing the integrity of pipes or welds provided on pipes. In addition, various isolation tools are known, which are used to isolate a particular section of a pipe from another, e.g., to prevent fumes, combustible vapours, etc., contained or generated within the pipe from reaching a welding region wherein heat from the welding procedure may result in ignition of such fumes. An isolation tool may also be used to prevent heat generated by the welding process from being conducted over the length of the pipe, and can be provided with a cooling water flow to act as a thermal barrier. Examples of such tools are provided in, e.g., U.S. Pat. Nos. 5,844,127 and 6,131,441; and PCT Publication No. WO 2010/022502 (the entire contents of these references being incorporated herein by reference).

In testing or isolation tools such as those exemplified in WO 2010/022502, a front plate and a back plate are coupled to an annular ring positioned therebetween using a series of threaded rods. To seal against the inner wall of a pipe, resilient sealing members (e.g., O-rings) are coaxially provided between the front plate and the annular ring, and between the annular ring and the back plate respectively. Either or both the front plate and the annular ring can provide a beveled surface to direct deformation and extrusion of one of the sealing members radially outward when tightened. Similarly, either or both the back plate and the annular ring provide a beveled surface to direct deformation and extrusion of the other of the sealing members radially outward when tightened.

One issue that may be encountered with this arrangement is that when the plates and annular ring are loosely coupled or otherwise not engaged with the sealing members, the sealing members may shift or slide out of alignment with the beveled surfaces causing an inconsistent seal about the circumference of the tool, among other things. Another related issue is that any such misalignment can make it difficult to insert the tool into the pipe or cause undue stress on the sealing members when positioning and securing the tool therein.

Thus, there exists a need for an improved testing or isolation tool that addresses at least one of these issues.

SUMMARY

A testing or isolation tool is provided in which a circumferential flange is provided between at least one of front and back plates and a centrally positioned annular ring to limit or inhibit radial movement of a sealing member interposed between the plate(s) and the annular ring.

In one aspect, there is provided an assembly for engaging an inner wall of a pipe, the assembly comprising: first and second end plates adapted to be coaxially aligned when in use, the first and second end plates each comprising one or more members extending from a first surface thereof; an annular ring provided between the end plates, the annular ring comprising one or more first slots at one end thereof to be aligned with and for receiving the one or more members of the first end plate, and one or more second slots at the other end thereof to be aligned with and for receiving the one or more members of the second end plate; a first resilient sealing member provided around the one or more members of the first end plate, between the first end plate and the annular ring; a second resilient sealing member provided around the one or more members of the second end plate, between the annular ring and the second end plate; and an urging mechanism adapted to urge the first and second end plates towards the annular ring to deform the first and second resilient sealing members to engage the inner wall of the pipe.

In another aspect, there is provided an isolation tool comprising the assembly.

In yet another aspect, there is provided a testing tool comprising the isolation tool.

In yet another aspect, there is provided a method of engaging an inner wall of a pipe using the assembly, comprising: placing the first and second resilient sealing members over the one or more members of the first and second end plates; coupling the first and second end plates to the annular ring in a loose manner using the urging mechanism to prepare the assembly; inserting the assembly into an interior of the pipe; and operating the urging mechanism to deform the first and second resilient sealing members outwardly into engagement with the inner wall.

BRIEF DESCRIPTION OF THE DRAWINGS

Embodiments will now be described with reference to the appended drawings wherein:

FIG. 6 is a side view of an annular ring of the testing or isolation tool;

FIG. 7 is an end view of the annular ring shown in FIG. 6;

DETAILED DESCRIPTION

Figure 1:
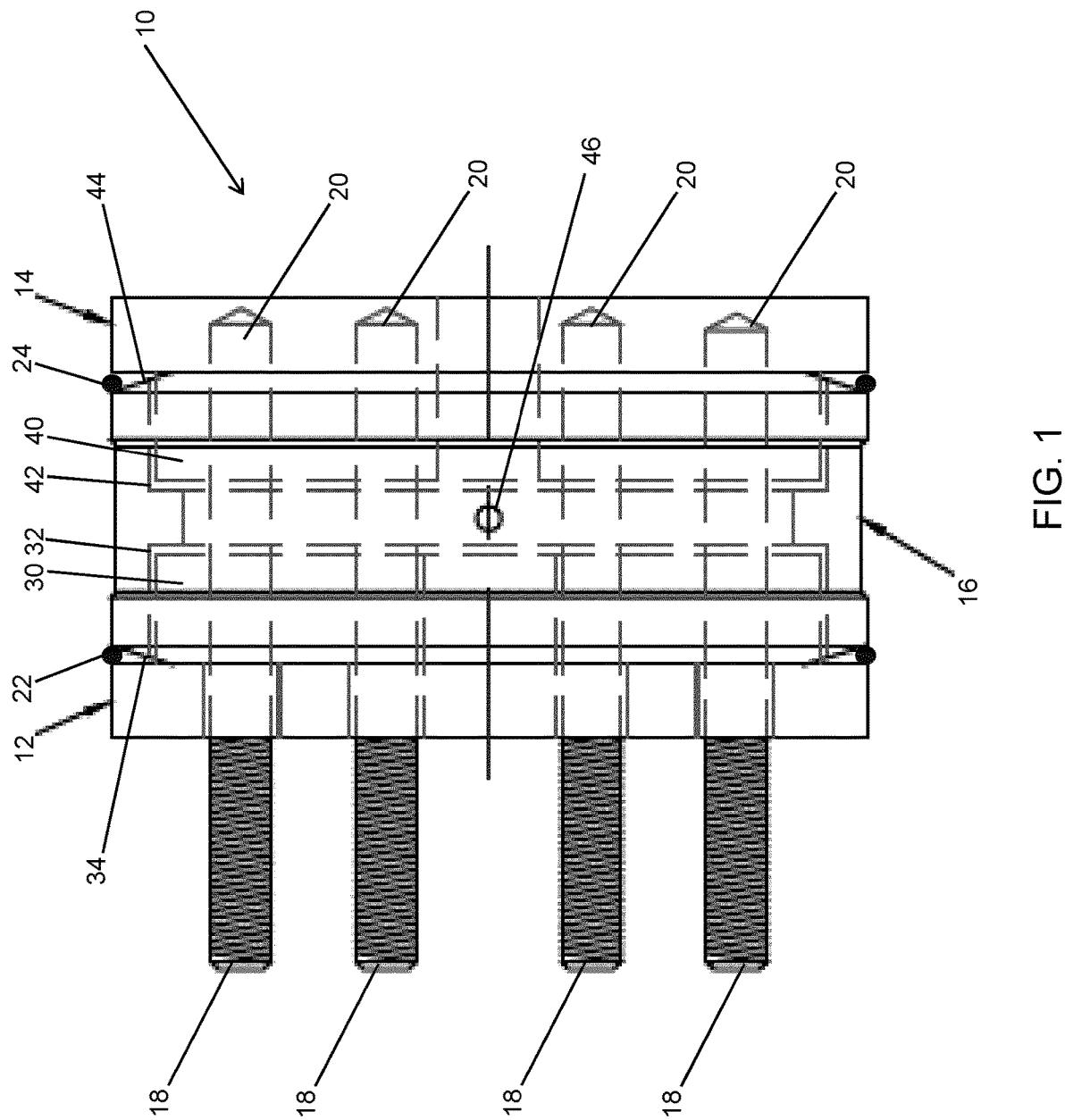
FIG. 1 is a side view of an assembled testing or isolation tool.

Turning now to the figures, FIG. 1 provides an assembly 10 for engaging the inner wall of a pipe or other tubular structure, which can be used, for example, as a testing tool, or as an isolation tool. The assembly 10 includes a front plate 12 and a back plate 14 coupled to opposite ends of an annular ring 16, using a series of threaded tie rods 18. It can be appreciated that the terms "front" and "back" are used herein for convenience in terms of the assembly 10 when installed in a pipe and in use, and can be referred to using other terms such as "first" and "second" end plates, "upstream" and "downstream" plates, and the like. The front plate 12, back plate 14, and annular ring 16 are axially aligned when assembled together as shown in FIG. 1.

First and second resilient sealing members 22 and 24 are coaxially provided, wherein the first sealing member 22 is provided between the front plate 12 and the annular ring 16, while the second sealing member 24 is provided between the annular ring 16 and the back plate 14. In the embodiment shown in FIG. 1, the opposite ends of the annular ring 16 are each preferably provided, at the outer edges thereof, with bevels 34 and 44 for receiving the respective resilient sealing members 22 and 24 and for directing its deformation radially outward (as discussed further below). In a similar manner, bevels (not shown) may be provided along the outer circumferential edge of the respective plates 12, 14 for achieving the same result. It will be understood that such bevels can be provided on one or both of the opposing faces of the plates 12, 14 and the annular ring 16.

The front plate 12 is provided with the series of threaded tie rods 18 that are generally circumferentially- and equidistantly-spaced. The rods 18 are sized and positioned to extend through the inner diameter of the sealing members 22, 24, and the annular ring 16. The back plate 14 is provided with a series of corresponding blind holes 20 that are reamed, drilled or milled thereinto for threadingly receiving the tie rods 18. The rods 18 allow circumferential tightening to urge together the plates 12, 14 and annular ring 16 using, for example, a series of corresponding nuts (not shown) threaded on the distal ends of the rods 18. It can be appreciated that the tie rods 18 and blind holes 20 are one example of an urging mechanism that, in general, urges the plates 12, 14 towards the annular ring 20 to deform the sealing members 22, 24 as described below.

Figure 2:
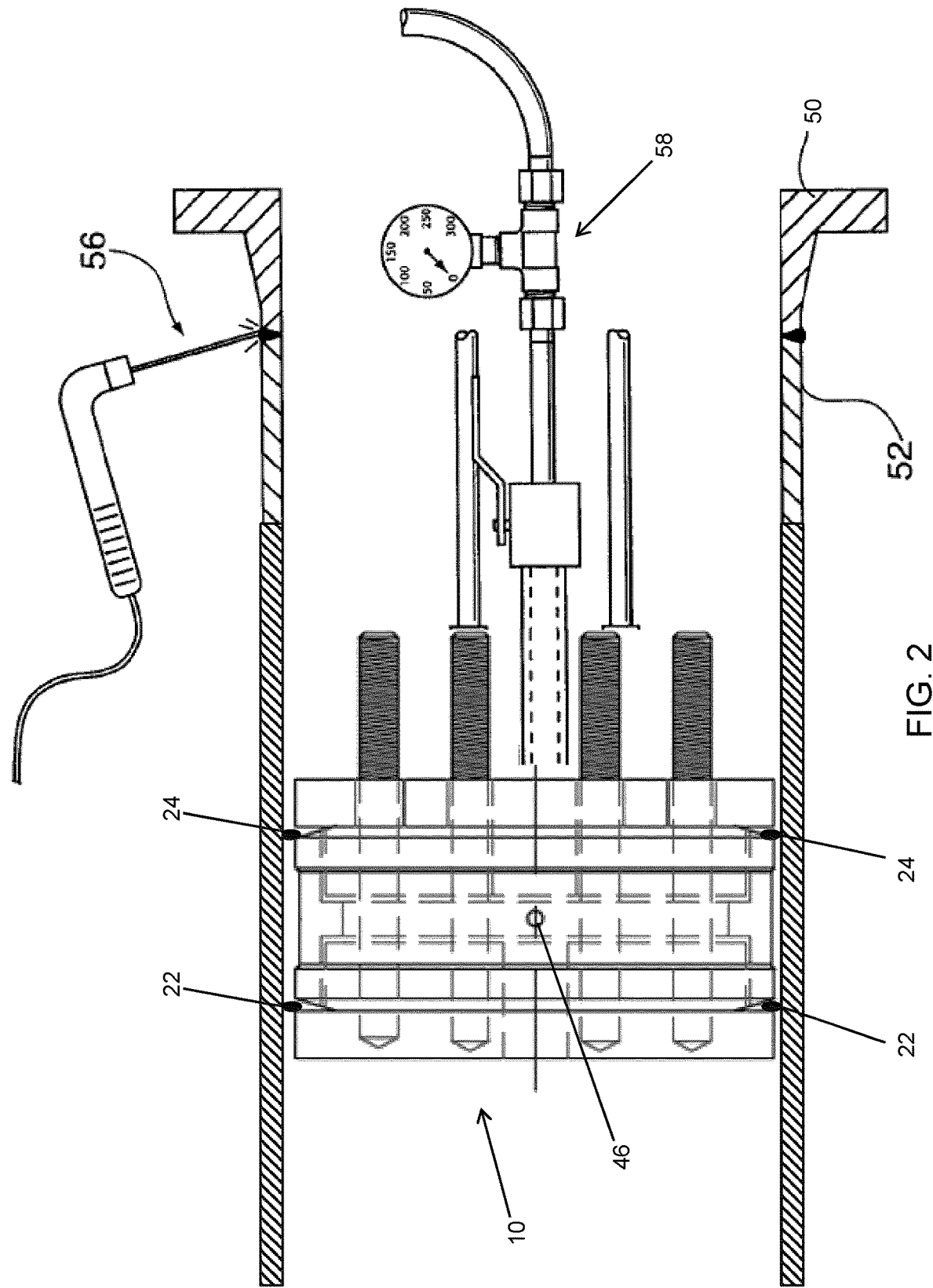
FIG. 2 is a schematic, partial cross-sectional view of the tool used to isolate a segment of a pipe for a welding process.

In operation, the assembly 10 is preferably pre-assembled in a loose manner and inserted into a pipe 52 as shown in FIG. 2, or other structure in which it is to be used. Once positioned in the desired location, the nuts are tightened, thereby urging all elements of the assembly together. In the result, the sealing members 22, 24 are deformed radially outwardly against the inner wall of the pipe 52, as illustrated in FIG. 2. As indicated above, a problem encountered with this assembly process is that the sealing members 22, 24 can become misaligned or otherwise be forced inwardly between the plates 12, 14 and the annular ring 16.

To address this problem, and referring again to FIG. 1, the annular ring 16 is provided with circumferential first and second slots 32, 42 at the opposing ends thereof, for receiving circumferential first and second flanges 30, 40 that extend from the front and back plates 12, 14 respectively. The sealing members 22, 24, which are typically embodied as circular O-rings, can be placed over or otherwise around the respective flanges 30, 40 to limit or inhibit shifting of the sealing members 22, 24 even when the assembly 10 is pre-assembled in a loose manner. This is due to the size and positioning of the flanges 20, 30 relative to the bevels 34, 44 as will be explained in greater detail below.

It can be appreciated that the flanges 30, 40 could instead extend from the annular ring 16, with the slots 32, 42 extending from the plates 12, 14. Similarly, while the flanges 30, 40 and slots 32, 42 in this example are shown as continuous circumferential members, multiple discontinuous flanges, posts or other members having various shapes or contours (with corresponding slots to receive same) could also be used without departing from the principles discussed herein. That is, various one or more members extending from the plates 12, 14 or annular ring 16 could be incorporated in order to provide a barrier to limit shifting of the sealing members 22, 24 as herein described.

Also shown in FIGS. 1 and 2 is a port 46 on the central circumferential surface of the annular ring 16. This port 46 is in communication with a quick coupler 70 (see FIG. 7) facing the back plate 14. Although not shown, a second port can be provided on the opposite side of the annular ring 16 and connected to another quick coupler 70. It can be appreciated that the quick couplers 70 can be connected to a medium in order to introduce that medium through the ports 46 to an area between the seals to establish and verify the seals, e.g., by using a pressure gauge 58. A medium such as water can also be introduced using this mechanism and circulated through the assembly 10 to create a heat exchanger, to cool the seals, pipe wall 50 and assembly 10 in high temperature events such as Post Weld Heat Treating. For example, as illustrated in the example shown in FIG. 2, a flange 50 is being attached to the pipe 52 by welding 56, and the pressure gauge 58 can be used to establish and verify the seals made by the first and second resilient sealing members 22, 24 to ensure the intended isolation is achieved.

Figure 3A:
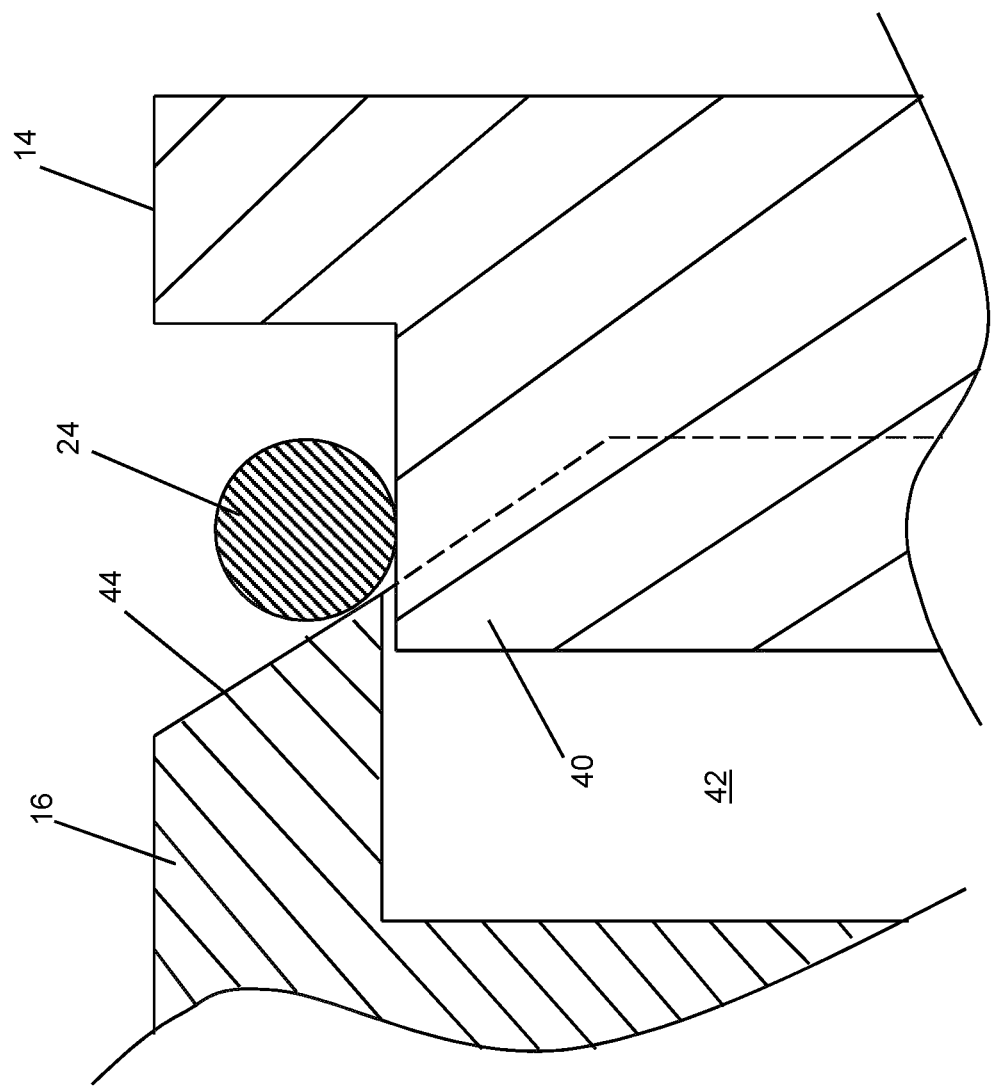
FIG. 3A is an enlarged cross-sectional view of a sealing member positioned between an annular ring and back plate of the tool, in an untightened configuration.
Figure 3B:
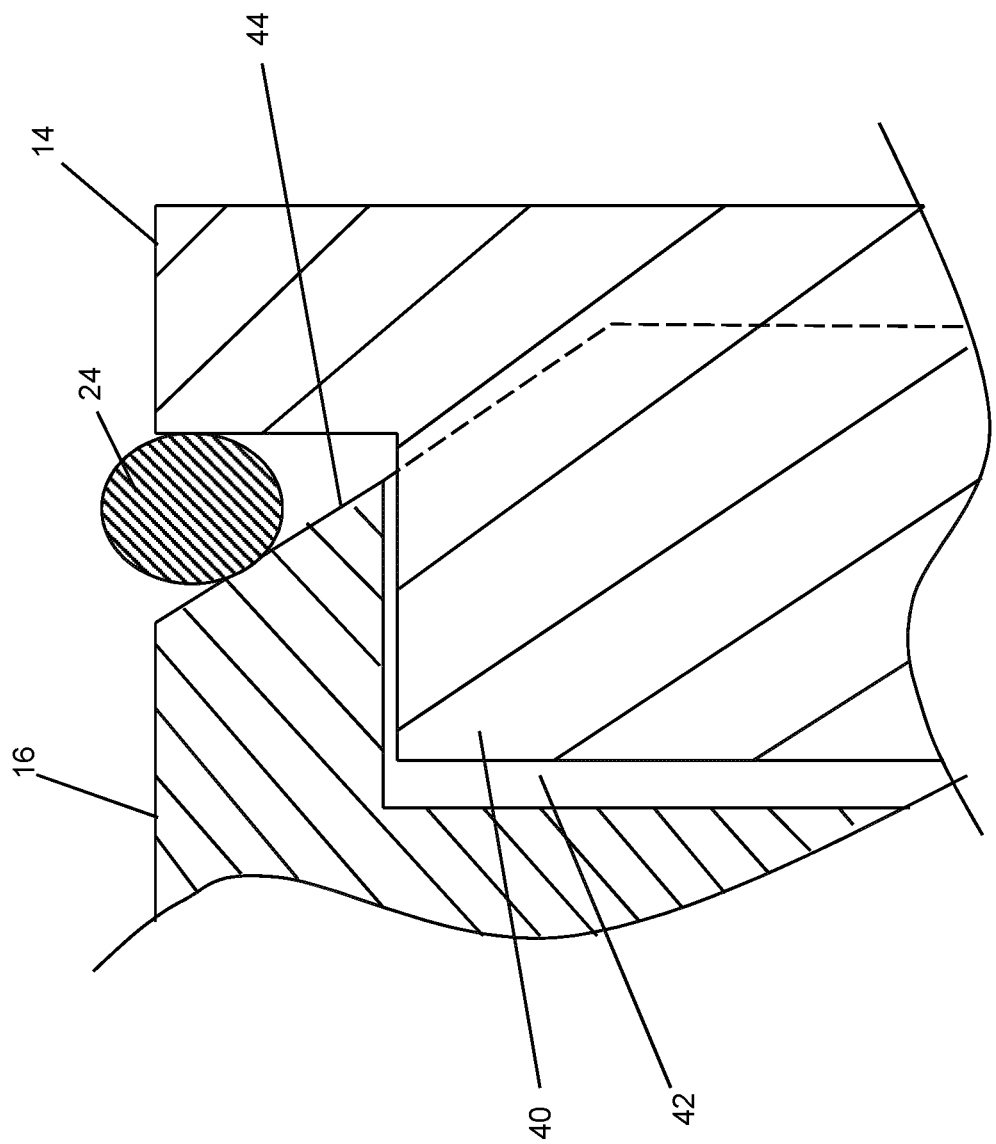
FIG. 3B is an enlarged cross-sectional view of the sealing member positioned between the annular ring and back plate of the tool, in an tightened configuration.

Turning now to FIGS. 3A and 3B, further detail concerning the flanges 30, 40 and slots 32, 42 is provided. Specifically, in FIG. 3A, the interface between the annular ring 16 and the back plate 14 is shown in which the second flange 40 extends from the back plate 14, and is received by the second slot 42 to provide a sliding barrier for the sealing member 24. It can be appreciated that the sizes and relative dimensions in FIG. 3A are illustrative only. For example, a larger diameter sealing member 24 may fill the entire notch between the second flange 40 and the back plate 14, instead of having a looser fit as shown in FIG. 3A. In either case, the second flange 40 prevents the second sealing member 24 from sliding between the annular ring 16 and the back plate 14, and thus maintains axial alignment of the sealing member 24 relative to the assembly. Moreover, the second flange 40 and second slot 42 are sized to permit the aforementioned loose pre-assembly of the plates 12, 14 and annular ring 16 while still providing the barrier. This is illustrated by the relative positioning of the annular ring 16 and back plate 14 in FIG. 3A.

FIG. 3B illustrates a tightened position in which the second sealing member 24 is urged towards and against the bevel 44 and deforms and extrudes outwardly as illustrated, e.g., in order to engage the inner wall of the pipe 52. It can be seen in FIG. 3B that as the annular ring 16 and back plate 14 are tightened together, the second flange 40 slidingly enters the second annular slot 42 so as to permit the tightening while maintaining the barrier to prevent inward movement or extrusion of the sealing member 24. It can be appreciated that similar principles apply to the first flange 30 and first slot 32 as the front plate 12 is simultaneously tightened against the annular ring 16 at the other end.

Figure 5:
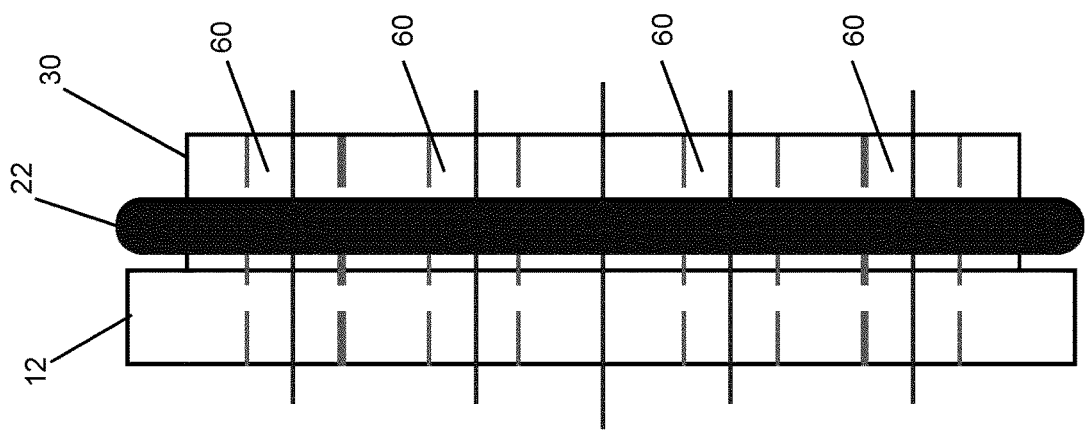
FIG. 5 is a side view of the front plate shown in FIG. 4.
Figure 4:
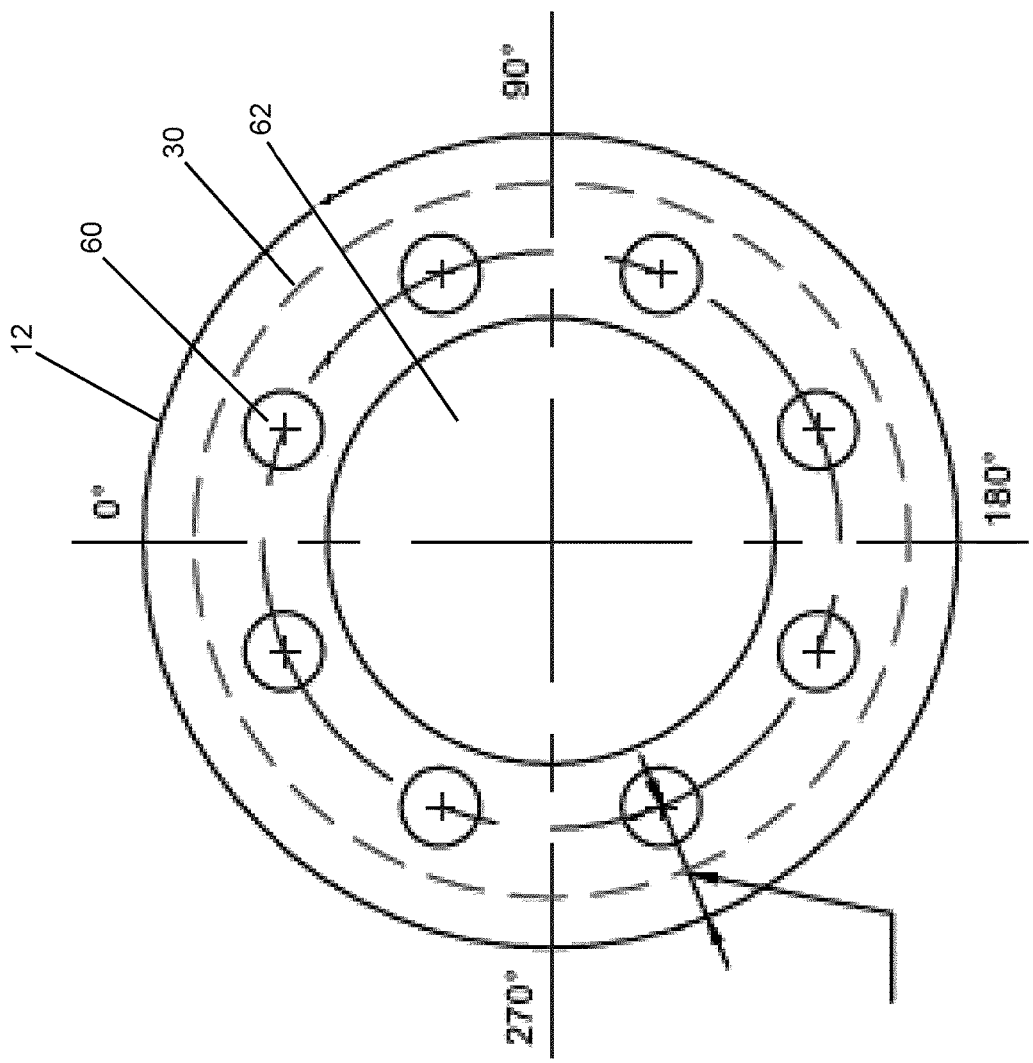
FIG. 4 is an end view of a front plate of the testing or isolation tool.

The front plate 12 is shown in isolation in FIGS. 4 and 5. In FIG. 4, a series of through holes 60 can be seen, which permit the tie rods 18 to pass through the front plate 12, annular ring 16 and for insertion and engagement with the back plate 14. It can be appreciated that the number and exact spacing of these through holes 60 would vary based on the diameter of the assembly 10.

FIG. 4 also illustrates the circumferentially equidistantly spaced arrangement of the through holes 60 and thus the positioning of the tie rods 18 relative to each other. The central passage 62 shown in FIG. 4 can be used to feed lines to the quick couplers 70 (see FIG. 7). In FIG. 5, an example of an O-ring-type sealing member 22 is shown as being inserted over the first flange 30 to maintain axial alignment when assembling the sealing member 22 and front plate 12 with the annular ring 16 and back plate 14. It has also been found that the flanges 30, 40 can prevent or at least mitigate uneven expansion of the sealing members 22, 24 without the need to necessarily torque the nuts in a particular sequence as was found with prior testing and isolation tools. Preferably, a maximum torque would be recommended to avoid damaging the threads or flanges 30, 40. This also avoids the need for special training for installing new tools 10, which can contribute to an improvement in jobsite safety.

Moreover, it can be appreciated that the diameter of the sealing members 22, 24 can be varied to accommodate different schedules of pipe 52. For example, a single 8" tool could be used to isolate or test an 8" sched 80, sched 60, sched 40 or sched 20 pipe, by increasing the diameter of the O-ring being used as the resilient sealing member 22, 24, from ½" to ⅝" to ¾" to ⅞" respectively. In this way, multiple schedules of pipe 52 can be accommodated with only requiring one assembly 10. This can reduce or minimize the need to manufacture additional schedules of the assembly 10. Similarly, additional training would not be required to choose the size of the O-ring in this example, since this would already be predetermined as being dependent on the schedule of pipe 52.

The annular ring 16 is shown in isolation in FIGS. 6 and 7. In FIG. 6, the extent to which the first and second slots 34, 44 extend inwardly can be observed. The slots 34, 44 surround a central passage 72 that permits the tie rods 18 to pass therethrough for engagement with the back plate 14. FIG. 7 shows the quick couplings 70 that connect to the ports 46 that extend outwardly as explained above. FIG. 7 also shows the positioning of the second slot 42 relative to the central passage 72, namely that it encircles the passage 72 and is axially aligned therewith.

Figure 8:
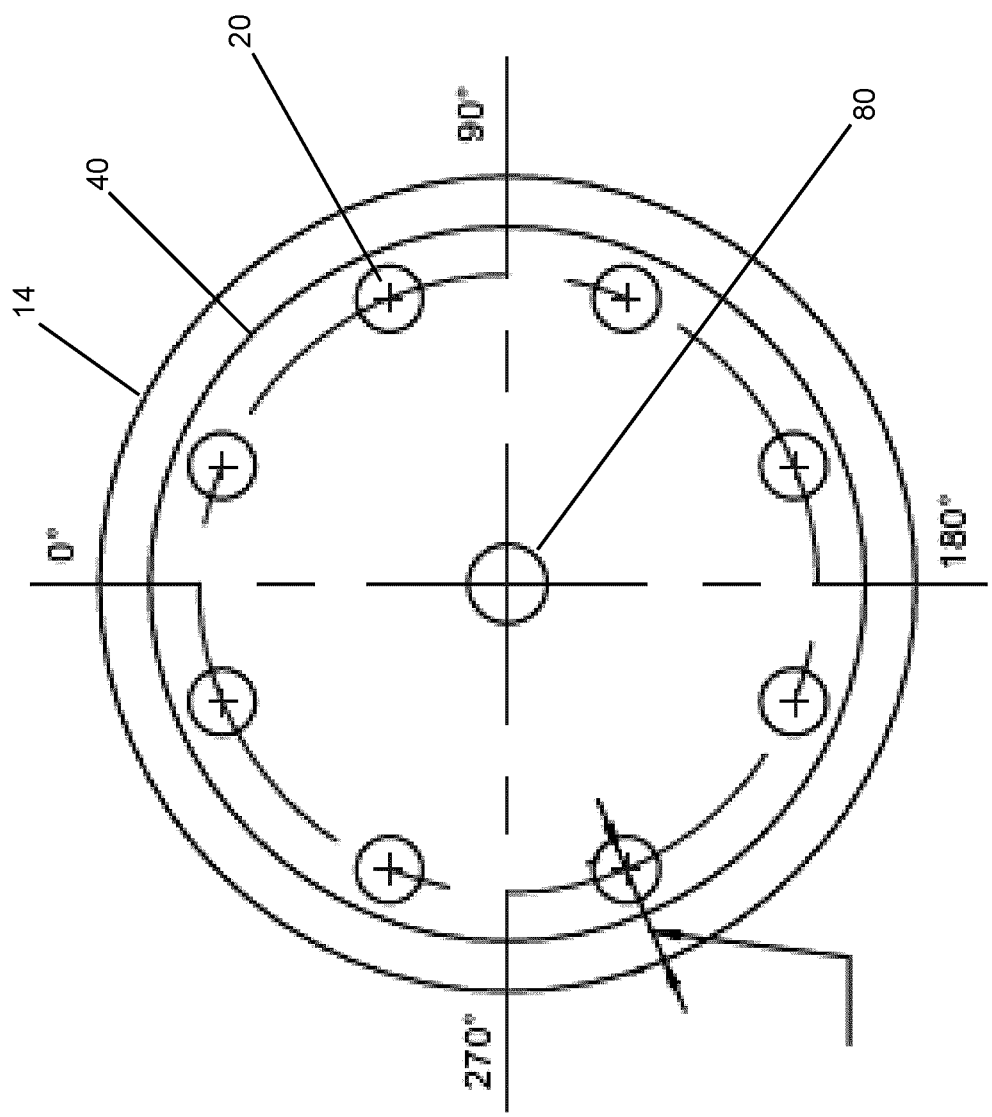
FIG. 8 is an end view of a back plate of the testing or isolation tool.
Figure 9:
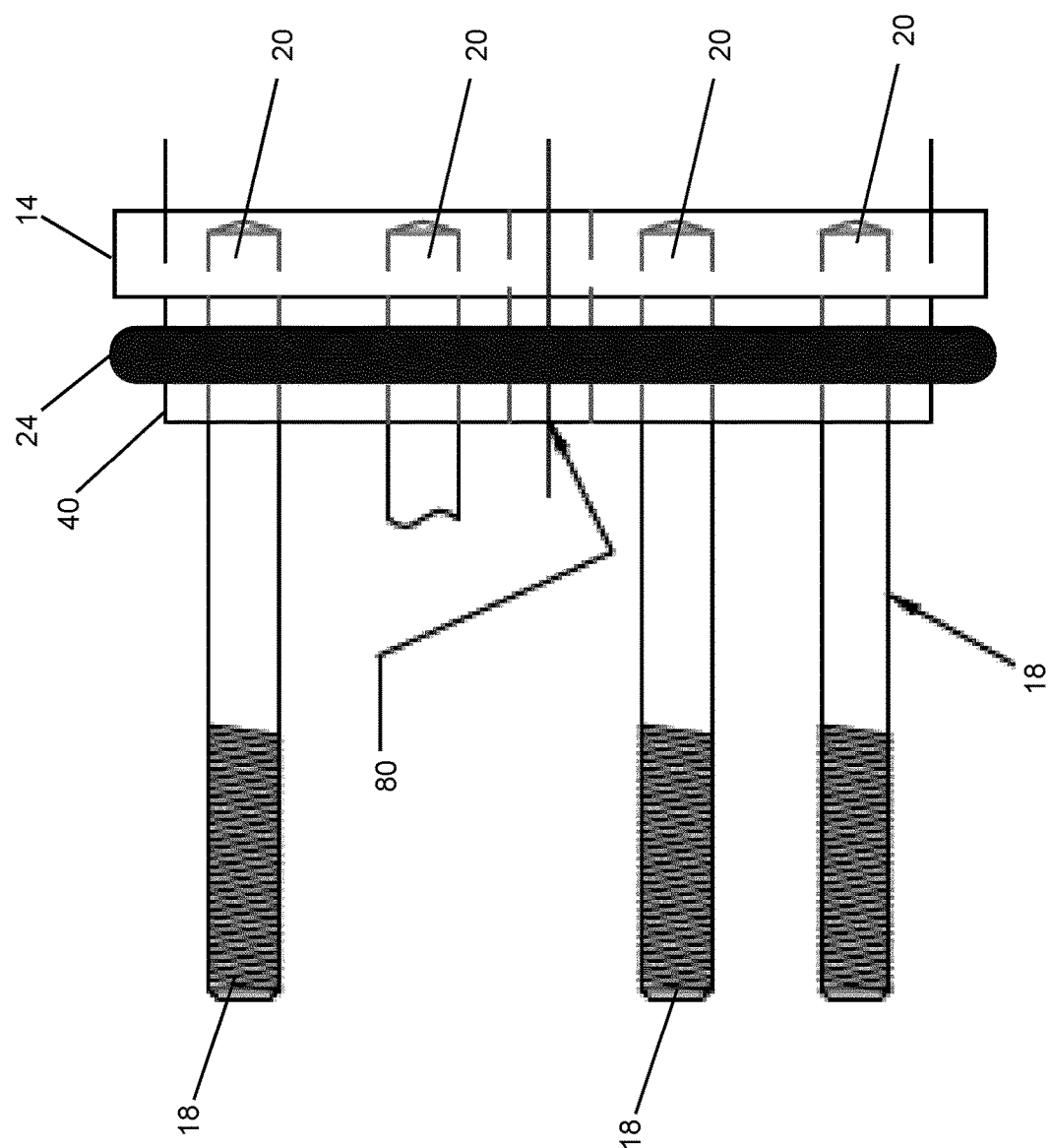
FIG. 9 is a side view of the back plate shown in FIG. 8.

The back plate 14 is shown in isolation in FIGS. 8 and 9. In FIG. 8, the circumferentially and equidistantly spaced blind holes 20 are axially aligned with a central passage 80. The central passage 80 in this example can be a ¾" NPT hole used to vent gases from behind the assembly 10 to a safe area. This prevents pressure from building up behind the assembly 10. In FIG. 9, an example of an O-ring-type sealing member 24 is shown as being inserted over the second flange 40 to maintain axial alignment when assembling the sealing member 24 and back plate 14 with the annular ring 16 and front plate 12.

The second sealing member 24 can therefore be placed over the second flange 40, and the tie rods 18 threaded into the blind holes 20 as shown in FIG. 9. The first sealing member 22 can likewise be placed over the first flange 30 as shown in FIG. 5. The annular ring 16 can then be slid over the tie rods 18, followed by the front plate 12 to axially align the components in the assembly. The sealing members 22, 24 are prevented from becoming unaligned in the manner depicted in FIG. 3A, such that when nuts are used to tightened the plates 12, 14 to the annular ring 16, the sealing members 22, 24 deform and extrude outwardly in a consistent manner to seal against the inner wall of the pipe 52. This consistent outward extrusion of the sealing members 22, 24 avoids the need to torque the nuts in a particular sequence, and the need for special training in order to install the assembly 10 in a pipe 52.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Although the above principles have been described with reference to certain specific examples, various modifications thereof will be apparent to those skilled in the art as outlined in the appended claims.

The invention claimed is:

1. An assembly for engaging an inner wall of a pipe, the assembly comprising:
   first and second end plates adapted to be coaxially aligned along a longitudinal axis of the assembly, when in use; the first and second end plates each comprising one or more flange members extending from a first surface thereof, each of the first surfaces of the first and second end plates comprising a flat portion at least on the outer perimeter thereof, wherein the flat portion is on a plane perpendicular to the longitudinal axis of the assembly;
   an annular ring provided between the end plates, the annular ring having opposed first and second faces, the first face comprising one or more first slots adapted to be aligned with and receive the one or more flange members of the first end plate, and the second face comprising one or more second slots adapted to be aligned with and receive the one or more flange members of the second end plate;
   the first and second faces of the annular ring having respective beveled edges on the outer perimeters thereof;
   a first notch defined by the one or more flange members of the first end plate, the flat portion of the first end plate, and the beveled edge of the first face of the annular ring;
   a second notch defined by the one or more flange members of the second end plate, the flat portion of the second end plate, and the beveled edge of the second face of the annular ring;
   a first resilient sealing member provided in the first notch and seated on the one or more flange members of the first end plate prior to the assembly engaging the inner wall of the pipe when the first resilient sealing member is provided in the first notch;
   a second resilient sealing member provided in the second notch and seated on the one or more flange members of the second end plate prior to the assembly engaging the inner wall of the pipe when second first resilient sealing member is provided in the second notch; and an urging mechanism adapted to urge the first and second end plates against the annular ring, whereby, when in use, the one or more flange members of the first and second end plates are received within the respective first and second slots of the annular ring, and the first and second resilient sealing members are compressed within the respective first and second notches and deformed radially outwardly to engage the inner wall of the pipe, wherein the urging mechanism comprises a series of circumferentially and equidistantly spaced tie rods detachably engaged with a series of corresponding circumferentially and equidistantly spaced blind holes in one of the end plates, the tie rods extending through the annular ring and the other of the end plates for tightening the end plates to the annular ring.

2. The assembly of claim 1, wherein the end plates are tightened to the annular ring using a series of nuts.

3. The assembly of claim 1, wherein the annular ring comprises at least one coupler for directing a fluid to a port extending to a surface thereof.

4. The assembly of claim 1, wherein the first and second resilient sealing members are O-rings.

5. The assembly of claim 1, wherein the one or more flange members of the first and second end plates are provided as a circumferential flange extending from each of the first and second end plates.

6. An isolation or testing tool comprising the assembly of claim 1.

7. An assembly for engaging an inner wall of a pipe, the assembly comprising:

first and second end plates adapted to be coaxially aligned along a longitudinal axis of the assembly, when in use;

an annular ring provided between the end plates, the annular ring having opposed first and second faces;

the annular ring comprising one or more flange members extending from each of the first and second faces, each of the first and second faces of the annular ring further comprising a flat portion at least on the outer perimeter thereof, wherein the flat portion is on a plane perpendicular to the longitudinal axis of the assembly;

each of the first and second end plates having a first surface, the first surface of the first end plate comprising one or more first slots adapted to be aligned with and receive the one or more flange members of the first face of the annular ring, and the first surface of the second end plate comprising one or more second slots adapted to be aligned with and receive the one or more flange members of the second face of the annular ring;

each of the first surfaces of the first and the second end plates having respective beveled edges on the outer perimeters thereof;

a first notch defined by the one or more flange members of the first face of the annular ring, the flat portion of the first face of the annular ring, and the beveled edge of the first surface of the first end plate;

a second notch defined by the one or more flange members of the second face of the annular ring, the flat portion of the second face of the annular ring, and the beveled edge of the first surface of the second end plate;

a first resilient sealing member provided in the first notch and seated on the one or more flange members of the first face of the annular ring prior to the assembly engaging the inner wall of the pipe when the first resilient sealing member is provided in the first notch;

a second resilient sealing member provided in the second notch and seated on the one or more flange members of the second face of the annular ring prior to the assembly engaging the inner wall of the pipe when the second resilient sealing member is provided in the second notch;

and an urging mechanism adapted to urge the first and second end plates against the annular ring, whereby, when in use, the one or more flange members of the first and second faces of the annular ring are received within the respective first and second slots of the first and second end plates, and the first and second resilient sealing members are compressed within the respective first and second notches and deformed radially outwardly to engage the inner wall of the pipe, wherein the urging mechanism comprises a series of circumferentially and equidistantly spaced tie rods detachably engaged with a series of corresponding circumferentially and equidistantly spaced blind holes in one of the end plates, the tie rods extending through the annular ring and the other of the end plates for tightening the end plates to the annular ring.

8. The assembly of claim 7, wherein the end plates are tightened to the annular ring using a series of nuts.

9. The assembly of claim 7, wherein the annular ring comprises at least one coupler for directing a fluid to a port extending to a surface thereof.

10. The assembly of claim 7, wherein the first and second resilient sealing members are O-rings.

11. The assembly of claim 7, wherein the one or more flange members of each of the first and second faces of the annular ring are provided as a circumferential flange extending from each face of the annular ring.

12. An isolation or testing tool comprising the assembly of claim 7.

* * * * *